United States Patent Office 3,197,457
Patented July 27, 1965

3,197,457
MONOAZO PIGMENTS
Guido Schetty, Basel, Emil Stocker, Riehen, near Basel, and Kurt E. Burdeska, Basel, Switzerland, assignors to J. R. Geigy A.-G., Basel, Switzerland
No Drawing. Filed Nov. 26, 1962, Ser. No. 240,164
Claims priority, application Switzerland, Nov. 29, 1961, 13,862/61
6 Claims. (Cl. 260—204)

The present invention concerns new monoazo pigments, a process for the production thereof, their use for the pigmenting of materials of all types and, as industrial product, the organic material pigmented therewith.

It has been found that valuable dyestuffs are obtained if diazotised 1-amino-2,4-dichlorobenzene-5-carboxylic acid amide is coupled with a 2-hydroxynaphthalene-3-carboxylic acid arylamide of the formula

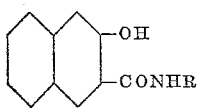

to form a monoazo pigment of Formula I

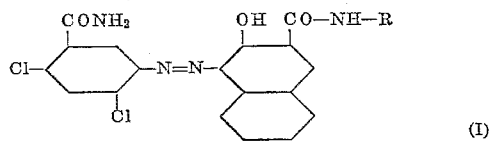

(I)

In these formulae, R represents an unsubstituted naphthyl radical or a phenyl radical with 0 to 3 substituents each of which is a methyl, ethyl, methoxy or ethoxy group or chlorine.

Among the pigments of the Formula I those in which R is phenyl, methylphenyl, dimethylphenyl, methoxyphenyl, ethoxyphenyl, dimethoxyphenyl, methoxy-methylphenyl, methyl-chlorophenyl, methoxy-chlorophenyl, dimethoxy-chlorophenyl, chlorophenyl, dichlorophenyl and naphthyl are particularly interesting.

Very good properties as pigments are possessed by those compounds according to the invention in which R is a radical of the benzene series and which have the Formula II

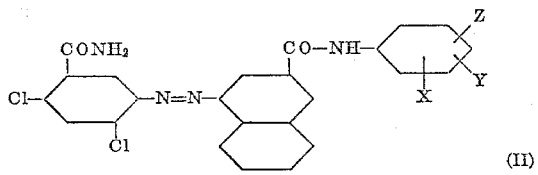

(II)

wherein

X is hydrogen, the methyl, methoxy or ethoxy group
Y is hydrogen, the methyl, methoxy or ethoxy group or chlorine,
Z is hydrogen, the methoxy group or chlorine.

Optimal properties are shown by those compounds of the above Formula II in which X is in 2-position, Y is in 4-position and Z is in 5-position relative to the —CO—NH-bridge.

The diazotised 1-amino - 2,4 - dichlorobenzene-5-carboxylic acid amide used according to the invention is obtained by reaction of 3 - nitro - 4,6 - dichlorobenzoyl chloride with ammonia, reduction of the nitro group to the amino group and then diazotisation of the amine, e.g. in mineral acid aqueous dispersion with sodium nitrite.

The diazotised amine is coupled with the azo component in aqueous solution or dispersion in the usual way, preferably in acetic acid medium, if necessary at a raised temperature. To accelerate the coupling or to influence the form of the pigment formed, auxiliaries can be added to the coupling mixture, e.g. organic solvents which are miscible with water such as lower alkanols, e.g. methanol or ethanol, ether alcohols such as ethylene glycol monomethyl or monoethyl ether, lower aliphatic ketones, e.g. acetone, lower fatty acid amides such as dimethyl formamide or certain tertiary nitrogen bases, e.g. pyridine bases, organic solvents which are not miscible with water such as aromatic hydrocarbons, e.g. benzene, toluene, xylene or tetrahydronaphthalene, also non-ionogenic, anion active or cation active dispersing agents, rosin soaps, protective colloids such as casein or methyl cellulose, also oils, plasticisers or solid colourless substrata such as barium sulphate or aluminum hydroxide.

The new monazo pigments precipitate immediately after the coupling. They are isolated in the usual way by filtering off and are purified by washing with water. If dye powders are desired, the filter cakes are dried.

Generally, the pulverulent monoazo pigments can be used without any further treatment. It is also possible to subsequently change the physical properties of the pigments or to improve them, e.g. by treatment with chemically inert organic liquids at a raised temperature and by milling in the presence of milling auxiliaries which can easily be removed later such as water soluble inorganic salts and/or organic solvents. In this way any undesirable substances also present can be removed; the particle size or form or the crystal structure can be altered and so the texture, shade, colour strength and fastness properties can be further improved. Also, however, the monoazo pigments can be further worked up as aqueous pastes or the water content thereof can be replaced by organic media.

The new dyestuffs are red to brown pigments; they are distinguished by their difficult solubility or insolubility in water as well as in many usual organic solvents and they are also distinguished by their fastness to oil. They also have good to very good fastness to light, in many cases they have strong colour and a pure shade.

They are suitable in particular for printing colours of all types as well as for graphic printing, printing of synthetic substances, such as foils of polyvinylchloride, polyethylene, as well as of celluloseacetate and regenerated cellulose, pigment printing as well as pad dyeing of textiles. They can also be used, however, for the pigmenting of various types of lacquers and paints, including dispersion colours, for the pigmenting of synthetic substances such as polyethylene polystyrene, polyesters hard polyvinyl chloride, melamine resins, urea-formaldehyde resins, condensation products of phenol and epoxide resins, and of rubber, of spinning and moulding masses, e.g. for the production of coloured objects made of cellulose acetates or regenerated cellulose. They can also be used for the dyeing of paper in the mass, of masses to be used for coating in the production of leathercloth.

Further details can be seen from the following examples. Where not otherwise expressly stated, parts are given as parts by weight. The temperatures are given in degrees centigrade. The relationship of parts by weight to parts by volume is as that of grammes to cubic centimetres.

EXAMPLE 1

4.10 parts of finely pulverised 1-amino-2,4-dichlorobenzene-5-carboxylic acid amide are added while stirring to 60 parts by volume of 2n-hydrochloric acid and the whole is stirred for 16 hours. The suspension of the hydrochloric salt of the amine is cooled to 0 to 3° by the addition of 60 parts of ice and water and it is then diazotised with 20 parts by volume of 1n sodium nitrite solution. After adding 200 parts of ice water, the solution is clarified by filtration and 50 parts by volume of cold 2n sodium acetate solution are added.

A solution of 6.04 parts of 2-hydroxynaphthalene-3- carboxylic acid-4'-methoxyphenylamide in 100 parts by volume of dimethyl formamide is added dropwise to this diazo solution whereupon the suspension of the precipitated pigment is stirred for a short time with a high speed turbine-type stirrer. Then the reaction mixture is slowly heated to 60–65° until the coupling is substantially complete. The pigment is filtered off under suction, washed with water and dried at 60–65°. It is a beautiful scarlet which is fast to oil and toluene and very fast to light. It is suitable, for example, for graphic printing inks and paints.

EXAMPLE 2

If in the Example 1, instead of 2-hydroxynaphthalene-3-carboxylic acid-4'-methoxyphenylamide, 6.33 parts of 2-hydroxynaphthalene-3-carboxylic acid-4'-ethoxyphenylamide are used and otherwise the same procedure as given in the Example 1 is followed, then a pigment of very similar properties is obtained.

EXAMPLE 3

If 6.66 parts of 2-hydroxynaphthalene-3-carboxylic acid-2',5'-dimethoxyphenylamide is used instead of the amide used as coupling component in Example 1 while following otherwise the same procedure, then a blueish red pigment is obtained which has also fastness to light and very good fastness to oil and toluene.

EXAMPLE 4

A brown pigment which has excellent fastness to light is obtained by using 6.33 parts of 2-hydroxynaphthalene-3-carboxylic acid-2'-methyl-4'-methoxyphenylamide instead of the coupling component used in Example 1, while following the same procedure.

If in the above described examples, using otherwise the same procedure, aliquot amounts of the coupling components given in the following table are used, then other azo pigments according to the invention having similar properties are obtained.

Table

| Example No. | Coupling component | Shade of pigment |
|---|---|---|
| 5 | 2-hydroxynaphthalene-3-carboxylic acid-2'-methoxy-phenylamide. | Scarlet. |
| 6 | 2-hydroxynaphthalene-3-carboxylic acid-2'-ethoxy-phenylamide. | Do. |
| 7 | 2-hydroxynaphthalene-3-carboxylic acid-2'-methoxy-5'-chlorophenylamide. | Do. |
| 8 | 2-hydroxynaphthalene-3-carboxylic acid-2',4'-dimethoxy-5'-chlorophenylamide. | Brownish red. |
| 9 | 2-hydroxynaphthalene-3-carboxylic acid-2',5'-dimethoxy-4'-chlorophenylamide. | Blueish red. |
| 10 | 2-hydroxynaphthalene-3-carboxylic acid-4'-chlorophenylamide. | Scarlet. |
| 11 | 2-hydroxynaphthalene-3-carboxylic acid-2'-methylphenylamide. | Do. |
| 12 | 2-hydroxynaphthalene-3-carboxylic acid-2',4'-dimethylphenylamide. | Do. |
| 13 | 2-hydroxynaphthalene-3-carboxylic acid-2'-methyl-4'-chlorophenylamide. | Do. |
| 14 | 2-hydroxynaphthalene-3-carboxylic acid-2'-methyl-5'-chlorophenylamide. | Do. |
| 15 | 2-hydroxynaphthalene-3-carboxylic acid-1'-naphthylamide. | Brownish red. |
| 16 | 2-hydroxynaphthalene-3-carboxylic acid-2'-naphthylamide. | Scarlet. |
| 17 | 2-hydroxynaphthalene-3-carboxylic acid-3',4'-dichlorophenylamide. | Red. |

EXAMPLE 18

20 parts of the pigment produced according to Example 1 are finely ground on a set of three rollers with 20 parts of hydrate of alumina, 60 parts of linseed oil varnish and 1 part of cobalt-lead-manganese naphthenate. This colour is then printed onto art paper by the book printing process.

EXAMPLE 19

20.8 parts of a mixed polymer from 15% vinyl acetate and 85% vinyl chloride are dissolved in 18.9 parts of cyclohexanone and 60.3 parts of methylethyl ketone, after which 4.0 parts of a 40% finely ground paste of the pigment produced according to Example 1 in dioctyl phthalate are added. A homogeneous dispersion is obtained by milling in a ball mill. This printing ink can be printed by the intaglio printing process for example on polyvinyl chloride sheets and it is fixed by drying in the air.

We claim:

1. A compound of the formula

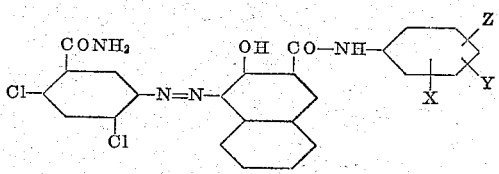

wherein
X is a member selected from the group consisting of hydrogen, methyl, and methoxy;
Y is a member selected from the group consisting of methyl, methoxy, ethoxy, and chlorine;
Z is a member selected from the group consisting of hydrogen, and chlorine.

2. The compound of the formula

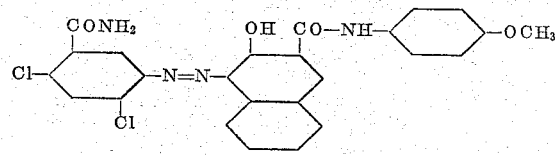

3. The compound of the formula

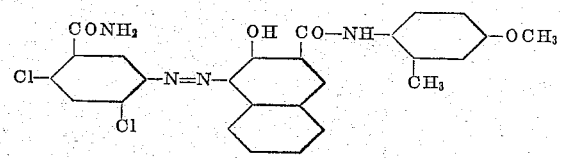

4. The compound of the formula

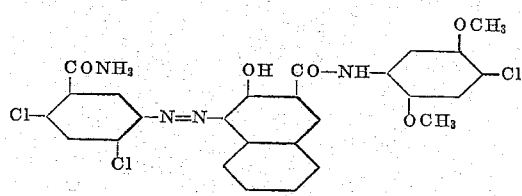

5. The compound of the formula

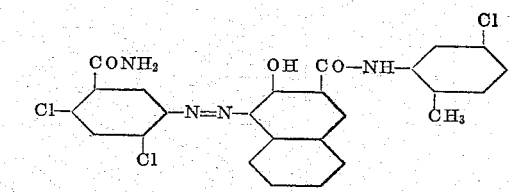

6. The compound of the formula

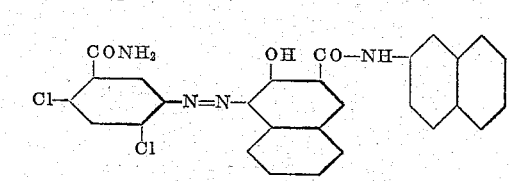

References Cited by the Examiner

UNITED STATES PATENTS

| 1,916,621 | 7/33 | Kracker | 260—204 |
| 1,992,461 | 2/35 | Baltes et al. | 260—204 |
| 2,899,421 | 8/54 | Fischer | 260—204 |

FOREIGN PATENTS 921,592  12/54  Germany.

CHARLES B. PARKER, *Primary Examiner.*